Feb. 25, 1930.                J. M. ROHLFING                  1,748,147
                                  TRUCK
                   Original Filed Dec. 15, 1923    2 Sheets-Sheet 1
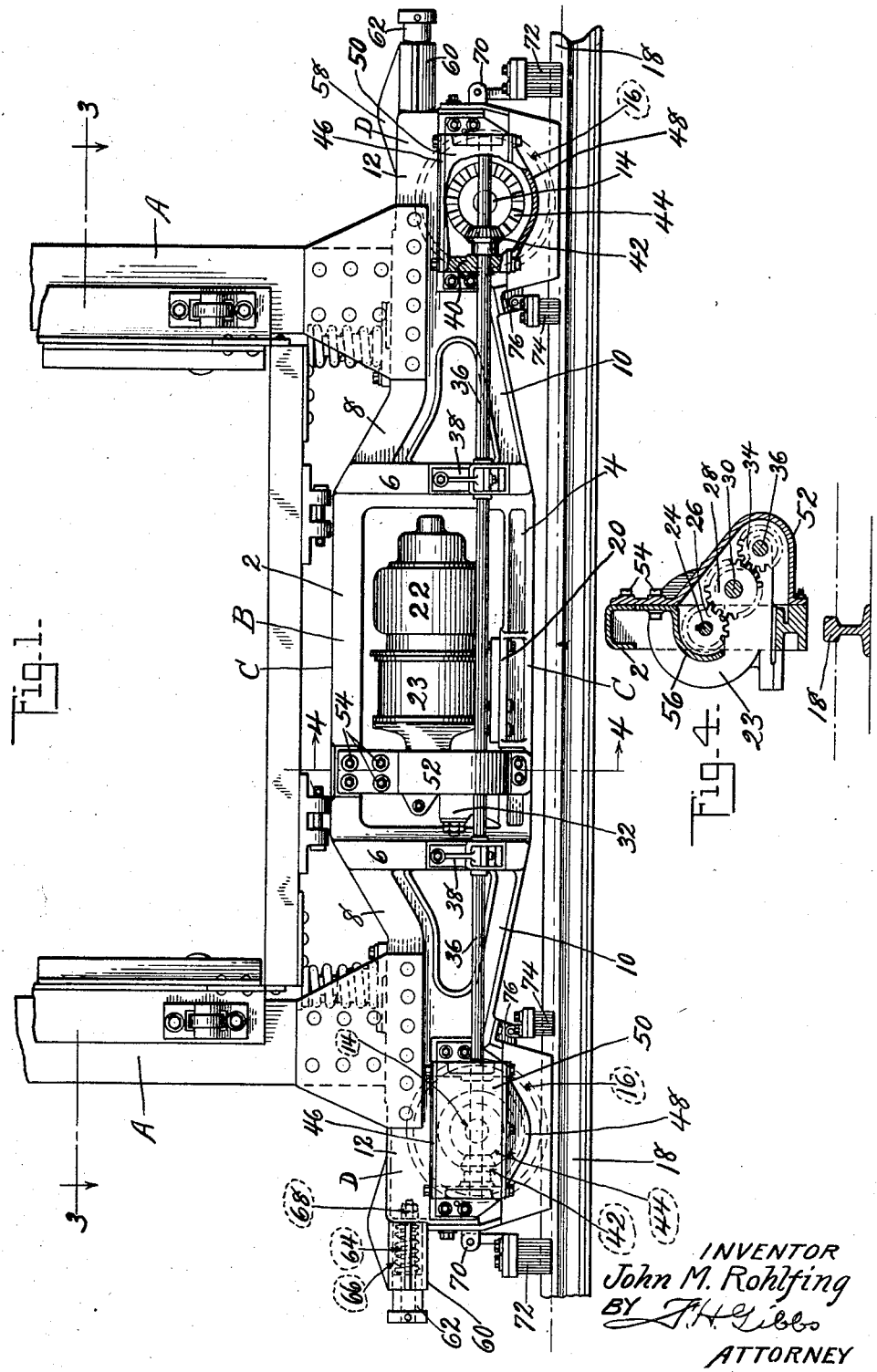
INVENTOR
John M. Rohlfing
BY J. H. Gibbs
ATTORNEY

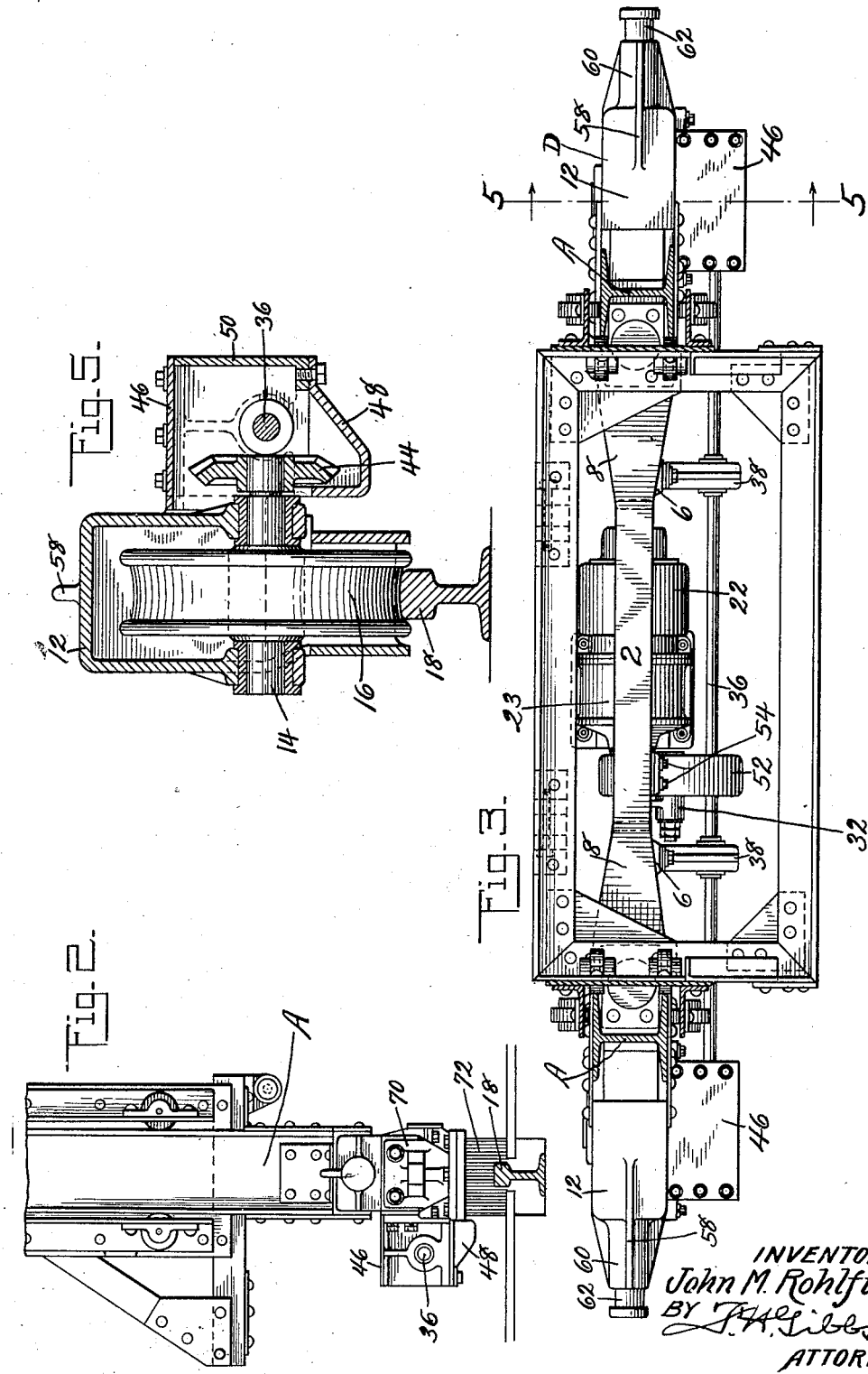

Patented Feb. 25, 1930

1,748,147

UNITED STATES PATENT OFFICE

JOHN M. ROHLFING, OF PLAINFIELD, NEW JERSEY, ASSIGNOR TO AMERICAN CAR AND FOUNDRY COMPANY, OF NEW YORK, N. Y., A CORPORATION OF NEW JERSEY

TRUCK

Original application filed December 15, 1923, Serial No. 680,880, now Patent No. 1,699,544, dated January 22, 1929. Divided and this application filed June 22, 1928. Serial No. 287,585.

This invention relates generally to portable elevators and has particular reference to an improved supporting carriage or truck therefor.

One object of this invention is the provision of a strong and durable carriage for supporting the frame of a portable elevator.

Another object of the invention is the provision of a truck formed of a single casting and having a driving means therefor.

A further object of the invention is the provision of a truck for the above specified purpose which is easy and inexpensive to manufacture and strong and durable in operation.

A still further object of the invention is the provision of a truck or carriage for supporting an elevator of the type shown in my copending application for patent on movable platform, Serial No. 680,880, filed December 15, 1923, which is now Patent No. 1,699,544, dated January 22, 1929, of which the present application is a division.

Other objects and advantages of this invention will be apparent from the following description, taken in conjunction with the accompanying drawings, in which:

Figure 1 is a side elevation of the lower end of an elevator showing the truck of the present invention;

Fig. 2 is an end view of the device shown in Fig. 1;

Fig. 3 is a top plan view of the truck of the present invention, the view being taken on the line 3—3 of Fig. 1;

Fig. 4 is a sectional view on the line 4—4 of Fig. 1; and

Fig. 5 is a sectional view on the line 5—5 of Fig. 3.

Referring now more particularly to the drawings, in which similar characters of reference designate similar parts in the several views, the frame of the portable elevator is indicated generally at A, the same being supported on a truck indicated generally at B and which comprises a unitary frame formed of a single casting and composed of the spaced top and bottom members 2 and 4 respectively which are connected at intermediate points by the vertical members 6. For convenience, I have designated the truck as comprising a central portion C and the end portions D. The top member 2 inclines downwardly at each end of the central portion C as shown at 8, and said ends are extended and joined with the ends 10 of the bottom member 4 to form channel shaped housings or structures 12 in which are journaled the axles 14 carrying wheels 16, which latter are adapted to travel on the track 18.

As shown clearly in Fig. 1, the members 2 and 4 are spaced from each other and the latter is formed with an integral seat 20 to which is secured a motor 22 driving, through suitable reduction gearing in a housing 23, a shaft 24 upon which is mounted a pinion 26 which meshes with a pinion 28 journaled on a stub axle 30 supported in a bracket 32 carried by the bottom member 4. The pinion 28 also meshes with a pinion 34 which is keyed on a shaft 36 journaled in bearings 38 secured to the vertical members 6 of the frame, and the ends of the shaft 36 are mounted in brackets 40 secured to the end portions of housings 12 as clearly shown in Figs. 1 and 5. Pinions 42 are keyed to the ends of the shaft 36 and mesh with gears 44 secured to the axles 14. The brackets 40 are provided with top and bottom cover plates 46 and 48 respectively and with front plates 50; the plates and brackets forming casings which enclose the gears 42 and 44, thus protecting them from dirt and also serving to retain the lubricant therefor. The pinions 26, 28 and 34 are positioned within a casing formed of a closure member 52 secured to the top and bottom members 2 and 4 by suitable fasteners 54, and an arcuate member 56 secured to the closure member 52, as clearly shown in Fig. 4.

The channel shaped housings 12 are provided with a reinforcing rib 58 and with integral tubuluar projecting portions 60 in which buffing members 62 are slidably mounted, each buffing member having a reduced portion 64 surrounded by a spring 66; the reduced portion extending through an opening formed in the end 12 and carrying the lock nuts 68 for an obvious purpose. Secured to the end housings 12 are brackets 70 to which are secured brushes 72 for removing small obstructions from the track. As an additional means of removing small obstructions from the track, other brushes 74 are provided which are secured to brackets 76 attached to the outwardly inclined portions 10 of the bottom member 4, as clearly shown in Fig. 1.

It is believed that the truck of the present invention will be fully apparent to those skilled in the art from the above description, but attention is called to the fact that there has been provided a truck formed of a single casting as a single unit, the truck comprising a frame having spaced top and bottom members intermediate the ends, which top and bottom members merge into end portions which are of inverted channel shape to define wheel housings. This generally is the thought of the present invention, but it is apparent that various changes in the form and proportions of the device may be made within the spirit of the invention without departing from the scope of the appended claims. It will also be apparent that the truck may be driven in either direction by a mere reversal of operation of the motor 22. The drawings disclose a single truck, but it is apparent that within the spirit of the present invention, a truck may be provided which is formed of spaced casting such as heretofore described, which castings may be connected in any suitable manner to provide a composite truck adapted to travel on spaced rails.

What is claimed is:

1. In a device of the class described, a carriage comprising a truck frame having separate top and bottom members joined at their ends, means intermediately connecting said members, a motor carried by the bottom member, and wheels journaled in the end portions of said frame.

2. In a device of the class described, a carriage comprising a truck frame having separate top and bottom members united at their ends in integral channel structures, a motor mounted on the bottom member, wheels journaled in said channel structures and an operative connection between said motor and wheels.

3. In a device of the class described, a carriage comprising a truck frame having separate top and bottom members joined at their ends by channel structures having integral annular projections, and yielding buffing members mounted in said projections.

4. A truck comprising separate top and bottom members spaced apart intermediate their ends and joined at their ends to define channel shaped housings, axles journaled in said housings, wheels mounted on the axles, pinions mounted on the axles, a motor mounted on the bottom member, a driving shaft secured to the truck and provided with gears meshing with the before-mentioned pinions, and reduction gearing driven by the motor for actuating the driving shaft.

5. A truck of the kind described comprising separate top and bottom members joined at their ends to define channel shaped housings and spaced apart intermediate their ends, axles journaled in the housings, wheels mounted on the axles, pinions mounted on the axles, brackets secured to the housings, a driving shaft having its ends supported by the brackets and carrying driving gears meshing with the before-mentioned pinions, top, bottom and front plates secured to the brackets and connected to provide casings, a motor mounted on the bottom member, and gearing driven by said motor for actuating said driving shaft.

6. A truck frame comprising a single casting having a portion thereof intermediate its ends formed into upper and lower members defining a motor receiving space, said lower member being cast with a motor supporting portion.

7. A truck frame comprising a single unit having a portion thereof intermediate its ends formed into upper and lower members defining a motor receiving space, said lower member being formed with a motor supporting portion, and inverted channel shaped wheel housings at the ends of the unit.

8. A truck frame of the kind described comprising a single cast unit having a portion thereof intermediate its ends formed into upper and lower members defining a motor receiving space and having the ends of said unit formed into inverted channel shaped wheel housings.

9. A truck frame of the character described comprising a single casting having the ends thereof formed into channel shaped wheel housings and having a portion thereof intermediate its ends formed into upper and lower members defining a motor receiving space therebetween, said lower member having a motor support cast therewith.

10. A truck frame of the character described comprising a single casting having a portion thereof intermediate its ends formed into upper and lower members defining a motor receiving space therebetween, said lower member having a motor support cast therewith, and vertical portions connecting said upper and lower members, the ends of said casting being formed into inverted channel shaped wheel housings.

11. In a truck of the kind described, a side frame comprising a truss casting the compression and tension members of which are united to define inverted channel-shaped wheel housings at the ends of the frame.

12. A side frame for car trucks comprising spaced top and bottom members integrally connected at their ends to define wheel receiving portions of inverted channel form.

13. A side frame for car trucks comprising a unitary casting having spaced portions intermediate the ends thereof which are united at their ends to define wheel supporting inverted channels.

In witness whereof I have hereunto set my hand.

JOHN M. ROHLFING.